INVENTOR
JOHN L. ASH II
BY Richard W. Treverton
ATTORNEY

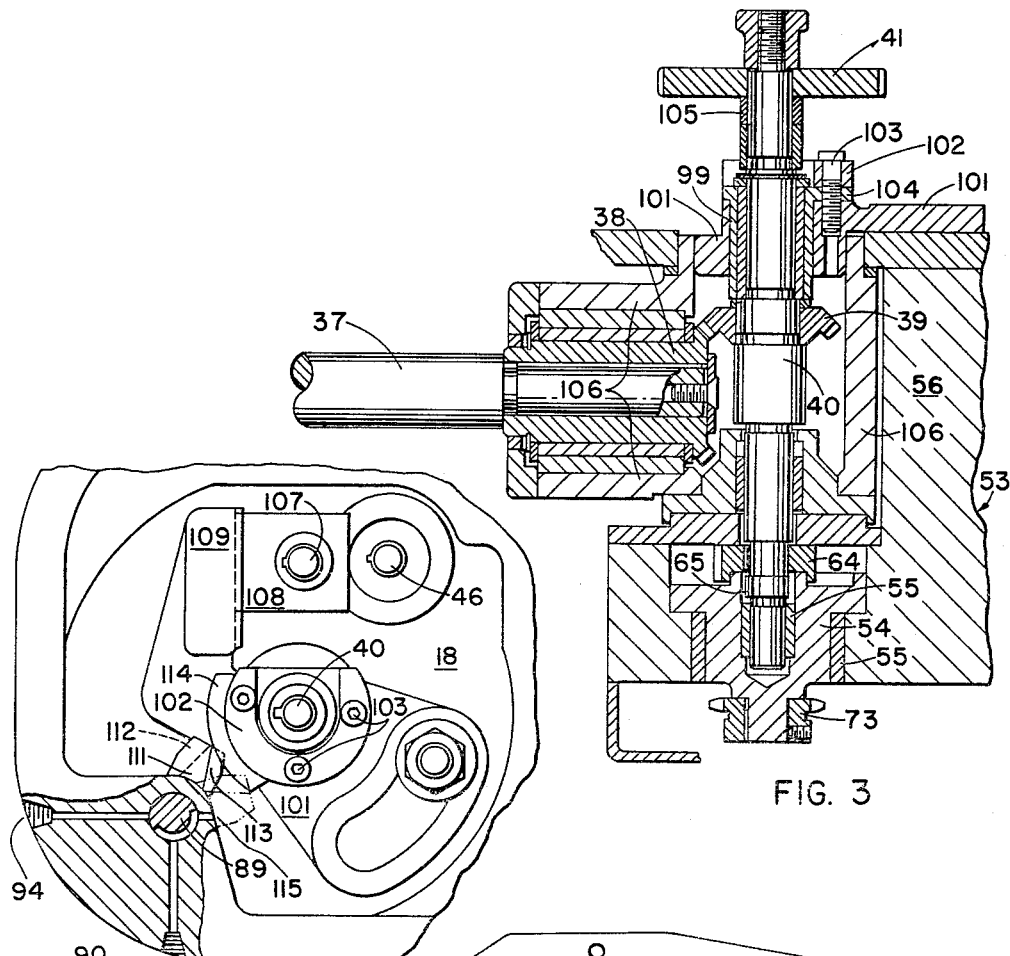
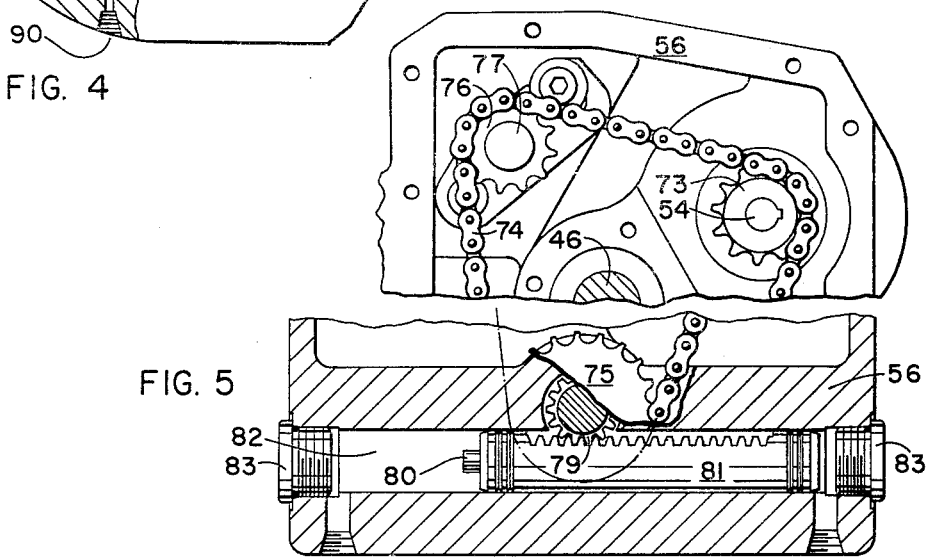

United States Patent Office 3,213,756
Patented Oct. 26, 1965

3,213,756
GEAR MACHINE AND INDEXING
MECHANISM THEREFOR
John L. Ash II, Pittsford, N.Y., assignor to The Gleason Works, Rochester, N.Y., a corporation of New York
Filed Sept. 26, 1963, Ser. No. 311,712
7 Claims. (Cl. 90—5)

The present invention relates to gear machines of the kind in which a bevel or hypoid work gear is rotated continuously and unidirectionally while a tool-carrying cradle is rotated back and forth, the tool cutting during cradle rotation in one direction only, and tooth-to-tooth indexing being effected by continuing rotation of the gear during the idle return rotation of the cradle.

Non-generated bevel and hypoid gears have heretofore been cut on such machines by adjusting the gear and the cradle to bring their axes into alignment and then rotating them in unison while cutting by means of a relative infeed between them in an axial direction. The present invention enables cutting while the gear is rigidly secured against rotation, which is desirable from the standpoints of accuracy of tooth spacing and quality of surface finish. It also eliminates the requirement that the gear and cradle axes be aligned, so that cutting may be by a method in which the cradle rotation is employed to travel a cradle-carried milling cutter along the tooth space being cut, in such manner that the cradle axis rather than the cutter axis constitutes the axis of length wise curvature of the tooth space.

A further object of the invention is an improved intermittent indexing mechanism, of simple and compact form, that is adapted to be brought into operation for the cutting of non-generated gears, and to be put out of operation when a gear, for example, the mate pinion of an non-generated gear, is to be generated by the method described above, utilizing continuous work rotation.

A preferred embodiment of the invention is shown in the accompanying drawings, wherein:

FIG. 3 is a vertical section through the index mechanism and the means for connecting and disconnecting it from the drive for the work spindle;

FIG. 4 is a plan view, partly in section, of the mechanism shown in FIG. 3;

FIG. 5 is a bottom plan view of the actuating means for the index mechanism, with parts broken away;

Figure 1:
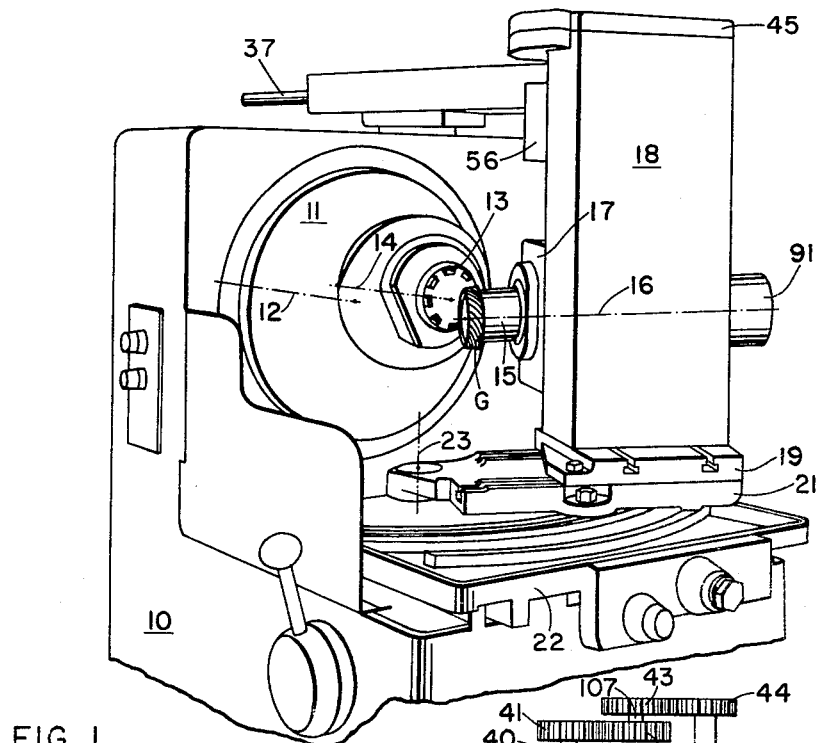
FIG. 1 is a perspective view of the upper portion of the machine.

Referring primarily to FIG. 1, the machine comprises a frame 10 supporting a cradle 11 for rotation about horizontal axis 12, the cradle rotatably supporting a tool 13 of the face mill type, whose rotation axis is designated 14. The cutter is adjustable on the cradle, both radially of axis 12 and also angularly thereof, the angular adjustment being universal, preferably in the manner disclosed in Patent No. 2,667,818 to A. L. Stewart et al. The work gear G is supported in a suitable work holder on a work spindle 15 journaled for rotation about horizontal axis 16 in a work head 17. A column 18 supports the work head for vertical adjustment thereon, to raise or lower the axis 16 relative to cradle axis 12. The column is adjustable horizontally, in a direction perpendicular to axis 16, on a plate 19 which itself is adjustable in a direction parallel to axis 16 on a swinging base 21. The latter is adjustable upon a sliding base 22 about a vertical axis 23 which intersects axis 12. The sliding base is adjustable, and also arranged for infeed and withdrawal on the frame 10, in a direction parallel to axis 12.

Figure 2:
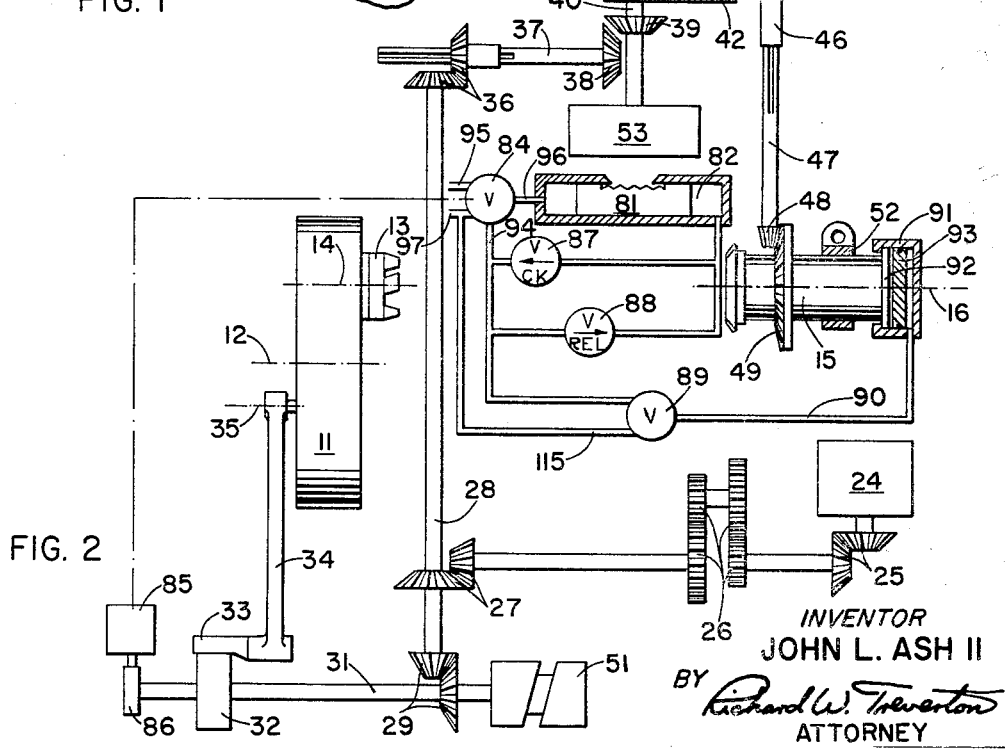
FIG. 2 is a diagram of the drive for the cradle and the work spindle of the machine.

Referring to FIG. 2, the drive for the machine includes motor 24, bevel gears 25, cycle speed change gears 26, bevel gears 27 and vertical shaft 28, all supported by the frame 10. The cradle is driven from shaft 28 through bevel gears 29, horizontal shaft 31 and cradle roll cam 32. This cam when rotated oscillates a cam follower lever 33 that is fulcrumed on the frame and pivoted to a connecting rod 34 that is also pivoted, on axis 35, to the cradle 11, with the result that the cradle is rocked back and forth about axis 12 once for each revolution of the cam. Suitable biasing means, not shown, are provided to hold the follower lever against the cam. The pivot axis 35 is adjustable on the cradle around axis 12, whereby the cutter may be placed in the desired position around the latter axis. The work spindle 15 is driven from shaft 28 through bevel gears 36, overhead shaft 37, bevel gears 38 and 39, shaft 40, index change gears 41–44 housed beneath cover 45 on column 18, a telescoping vertical shaft comprising an upper section 46 journaled in the column and a lower section 47 journaled in work head 17, a hypoid pinion 48 on shaft section 47 and a gear 49 on the spindle 15. The lever 33 is of a kind which is adjustable, in a known manner, to vary the angle through which the cradle is rocked back and forth. If desired, this lever and the connecting rod 34 may be replaced by an adjustable ratio mechanism of the kind disclosed in Patent No. 3,046,799 of myself and H. Pedersen.

For the conventional generation of gears, including mate pinions for non-generated gears, the bevel gears 38, 39 are brought into mesh and the machine is operated so that the spindle 15 rotates unidirectionally, while the cradle is rocked back and forth about its axis 12. A feed cam 51 on shaft 31 acts to infeed the sliding base 22 to advance the work gear G into cutting position at the beginning of each forward roll of the cradle (counterclockwise in FIG. 1) and to withdraw the sliding base to bring the gear clear of the cutter at the end of each forward roll. During the forward roll, the cutter 13, driven either by motor 24 through gearing, not shown, or by a separate motor, generates one tooth slot of the gear. The continuing rotation of the gear G during the idle return roll of the cradle indexes the gear in preparation for the generation of another tooth slot during the next forward roll of the cradle. Throughout the cutting operation a friction brake 52 mounted in the work head 17 acts on the spindle 15 to resist rotation thereof and thereby prevent backlash in the spindle drive gearing. Cam 32 is so shaped that during the cutting phase of operation the cradle and work spindle rotate in substantially constant velocity relation, at a ratio which may be adjusted by exchange of gears 41–44, or by adjustment of the drive ratio of the mechanism connecting cam 32 to the cradle, or both.

Non-generated gears may be cut on the machine by disengaging the gears 38, 39 and driving the spindle gear train 41 to 44 and 46 to 49 by an intermittent indexing mechanism, designated 53 in FIG. 2. Cutting may be by a method in which the sides of the tooth slots are cut as surfaces of revolution complementary to the surfaces described by the side cutting edges of the rotating cutter 13. In such case the follower lever 33 is disengaged from the cam 32 and the cradle 11 is locked against rotation in the frame. Cutting is effected by infeed of the work-carrying slide 22 by cam 51. The index mechanism 53 is operated intermittently to advance the work spindle by one or more tooth spaces upon each withdrawal of the slide by the cam.

Or, if desired, the gears may be cut by the method disclosed in the application of C. B. King, Serial No. 311,704, filed on even date herewith. By that method the machine is so adjusted that the cradle axis 12 instead of cutter axis 14 coincides with the axis of lengthwise curvature of the tooth slot being cut. While the cutter is rotating about its own axis 14 and the cradle is held against rotation by a dwell in cam 32, the work is infed by cam 51 so that one end of the tooth slot is cut to full depth. Then the cam 32 rotates the cradle to swing the rotating cutter along the tooth slot to the opposite end thereof. Cam 51 then withdraws the work to enable tooth-to-tooth indexing during the return motion of the cradle. Thus the tooth sides are cut as surfaces of revolution about axis 12. If desired, they may be cut as helicoidal surfaces instead of surfaces of revolution by providing a cam 51 or equivalent device that is adapted to feed the work along axis 12 while the forward roll of the cradle is taking place.

Referring to FIGS. 3 and 6 to 8, the index mechanism 53, which is the subject of my patent application Serial No. 424,694, filed January 11, 1965, comprises a driver 54 reversingly rotatable on bushings 55 on shaft 40 and in part 56 of the column 18. The driver includes a pawl 57 pivoted thereto by pin 58 and urged clockwise relative thereto by a coil spring 59; and also includes an integral arcuate flange 61. The pawl has a face 62 adapted for abutment with a shoulder 63 on a driven member 64. The latter is mounted on the shaft 40 and has a keyway for receiving a key 65 provided on the shaft. An opposing shoulder 66 on the driven member is adapted for abutment by face 67 of a positioning pawl 68 that is pivoted to the column part 56 by a pin 69 and is urged counterclockwise about the pin by a coil spring 71. Pawl 68 has a pin 72 adapted to engage the flange 61.

Figure 6:
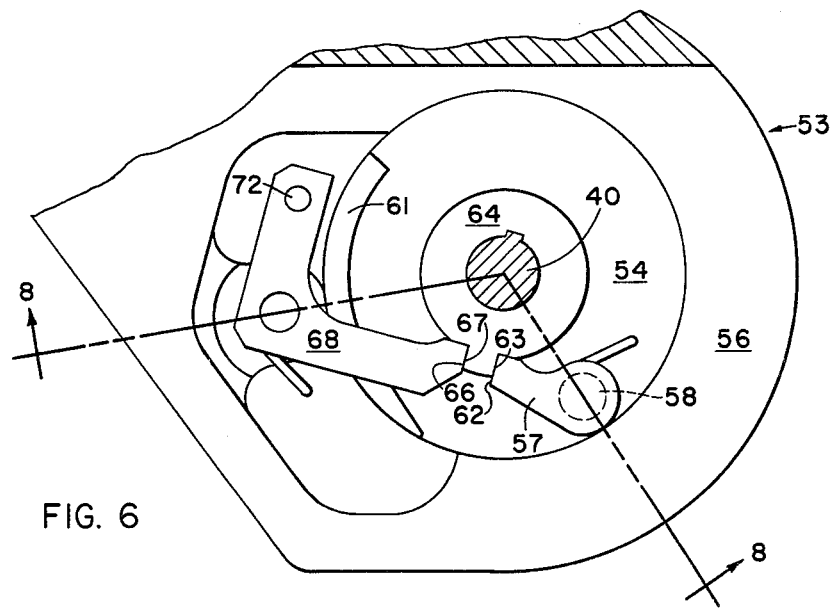
FIG. 6 is a plan view of the index mechanism, in plane 6—6 of FIG. 8.
Figure 7:
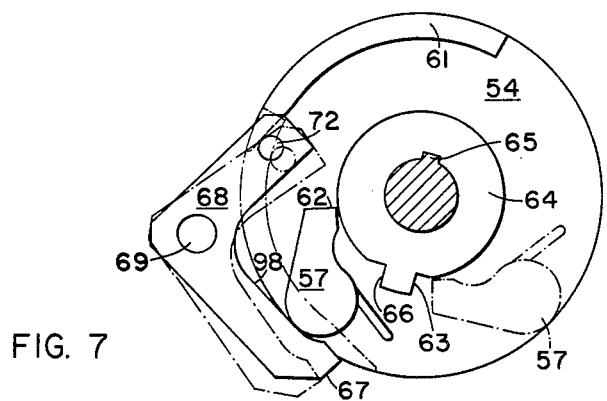
FIG. 7 is a similar plan view but showing the parts in a different position of operation than in FIG. 6; and, FIG. 8 is a vertical section in the planes designated 8—8 in FIG. 6.
Figure 8:
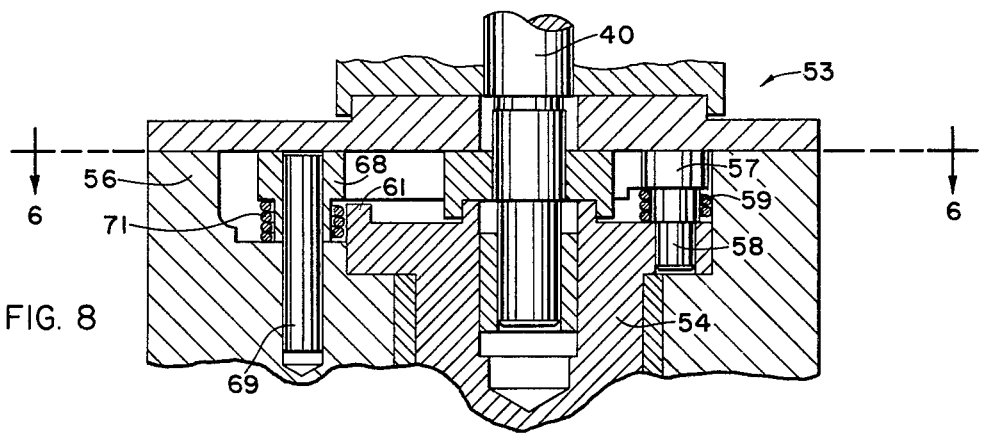

A sprocket 73, FIGS. 3 and 5, affixed to the lower end of the driver 54, engages an endless chain 74 which extends around a drive sprocket 75 and a chain-tensioning idler sprocket 76 supported by a pin 77 adjustable on column part 56. Sprocket 75 is co-rotatable in the column part with a pinion 79 which meshes rack teeth on a piston 81. The latter is reciprocable in a cylinder bore 82 in part 56 by hydraulic pressure. A stop button 80 on piston 81 abuts the left cylinder closure 83 to limit counterclockwise rotation of the driver 54, 57, FIGS. 6 and 7, to the broken line position shown in FIG. 7. Clockwise rotation of the driver is limited by abutment of surfaces 62, 63 and 66, 67, as shown in FIG. 6. Thus the angle of rotation of the driver is slightly greater than 360°.

The application of hydraulic pressure is controlled by a solenoid-operated reversing valve 84, FIG. 2, which in turn is controlled by a switch 85 actuated by a cam 86 on shaft 31. The hydraulic system further includes a check valve 87 and a pressure-opened or relief valve 88. The valve 84 and a manually-operated valve 89 (see also FIG. 4) control a clamp for holding the spindle 15 against rotation. The clamp comprises a cylinder member 91 supported by the work head 17 and engageable with one face of a flange 92 of the spindle, and a piston 93 in the cylinder engageable with the opposite face of the flange.

Indexing is effected, as soon as cam 51 has withdrawn the sliding base 22 to clear the work from the cutter, by cam 86 closing switch 85; and resetting of the index mechanism follows, after a delay long enough to allow indexing to take place, as a result of re-opening of the switch. The indexing is as follows: During the cutting operation valve 84 connects line 94 to main hydraulic pressure line 95 and line 96 to main hydraulic exhaust line 97 so that the piston 81 is held in its left limit position in FIGS. 2 and 5, and, valve 89 being open, clamp 91–93 is applied by pressure from line 90. The pawl 57 and flange 61 of the driver are in the positions shown in broken lines in FIG. 7. As soon as the switch closes, reversing the valve 84, line 96 is put on pressure and line 94 on exhaust, thereby releasing the clamp. The piston 81 is moved to the right, fluid exhausting from the right cylinder chamber through check valve 87. The driver 54 being rotated clockwise in FIGS. 6 and 7, pawl 57 abuts shoulder 63 and drives member 64 through one complete turn, ending in the position shown in FIG. 6 wherein shoulder 66 abuts the face of pawl 68 under hydraulic pressure. During this rotation, the flange 61 releases the pin 72 of pawl 68 which allows the pawl to move from the position of FIG. 7 to that of FIG. 6.

In the index resetting action, which occurs upon the subsequent reopening of switch 85, valve 84 is reversed to connect line 96 to exhaust line 97 and line 94 to pressure line 95. Pressure is first applied to clamp 91–93, thereby clamping the spindle 15 against rotation, and then, upon opening of valve 88, piston 81 is moved to the left, returning the driver by counterclockwise rotation to bring the pawl 57 and flange 61 to their positions shown in broken lines in FIG. 7. Just prior to the driver reaching the position shown in full lines in FIG. 7 the pawl 57 has, by cam engagement with surface 98 of pawl 68, pivoted the latter pawl to the position shown wherein pin 72 may be engaged and held by flange 61.

When the index mechanism is being used, i.e. when cutting non-generated gears, the shaft 40 is elevated from its position shown in FIG. 3 sufficiently to engage key 65 with the keyway in driver 64 and to separate bevel gear 39 from bevel gear 38. For the purpose of such shifting the gear 39 is rigidly secured to shaft 40 and the latter is journaled for rotation and held against relative axial motion in a flanged quill 99 which is slidable axially in a bore of a change-gear-supporting sector 101, FIGS. 3 and 4, this sector being adjustably secured to the column 18. A U-shaped collar 102 is connected to the sector by screws 103 which also extend through the flange 104 of the quill and are threaded into the sector. When the index mechanism is not to be used and gears 38, 39 are to be meshed, the collar 102 is placed above flange 104, as shown. When the index is to be used, the collar is interposed between flange 104 and sector 101, which elevates the shaft and quill sufficiently to disengage gear 39 from gear 38 and to enter key 65 into the keyway of driver 64. In order that change gear 41 may be at the same elevation in either position of shaft 40, a spacer sleeve 105 of the same thickness as the collar is adapted to be placed either under the gear, as shown, or above the gear. The gear 38 is journaled in a member 106 which is arranged to swivel on the column 18 about the axis of shaft 40 in order to accommodate adjustment of the column on the machine frame, and the sector 101 is also adjustable about this axis in a known manner in order to accommodate change gears of different diameters. A shaft 107 for gears 42 and 43 is rotatably supported by a slide 108 that is adjustable on part 109 of the sector 101 to vary the center distance between shafts 107 and 40.

The valve 89 has an actuating lever 111, FIG. 4, provided with notches 112 and 113 respectively on its lower and upper faces. A flange 114 on collar 102 so interfits with these notches that the collar can be placed in its lower position, beneath flange 104, only when the valve is turned to the broken line position of lever 111, to connect clamp cylinder 91 to line 94, and can be placed in its upper position, shown, only when the valve is turned to the full line position of the lever, to connect the clamp cylinder to exhaust lines 115, 97. The flange 114 of collar 102 and notches 112, 113 of lever 111 thus constitute a mechanical interlock between the valve means controlling the clamp and the shift clutch constituted by quill 99, gears 38, 39, key 65 and the keyway in driver 64, such interlock enabling the clamp to be applied when, and only when, the work spindle is connected for operation by the indexing mechanism 53. When the index mechanism is not to be used in operation of the machine, cam 86 may be removed, which prevents idle actuation of valve 84.

Having now described the preferred embodiment of the invention, and its operation and use, what is claimed is:

1. A gear machine comprising a frame supporting a tool-carrying cradle for rotation thereon, a work spindle and a housing therefor on the frame, drive means for reversingly rotating said cradle, a gear train for driving the spindle, said gear train being connectible to said drive means for unidirectional rotation thereby in time with reversing rotation of the cradle, an intermittent index mechanism arranged for operation in time with said drive means, and means for connecting the gear train either to said mechanism or to said drive means.

2. A machine according to claim 1 in which said gear train comprises change gears, to enable adjustment of the ratio of angular motion of the spindle relative to that of the cradle or of the index mechanism, and a brake on the spindle to eliminate backlash in said gear train.

3. A machine according to claim 1 in which there is a clamp for said spindle, and means for coordinating operation of said clamp with that of said index mechanism, for clamping the spindle to its housing at the conclusion of each indexing operation.

4. A machine according to claim 3 in which said means connecting said gear train either to said index mechanism or to said drive means comprises a shift clutch, and there is a mechanical interlock between said clutch and control means for said clamp, to prevent application of the clamp when said clutch connects the gear train to said drive means.

5. A machine according to claim 1 in which said index mechanism comprises a support, a driver mounted for angular oscillation on said support, a driven member connectible to said gear train and rotatable on the support coaxially of the driver, means operating in time with said drive means for oscillating said driver through an angle of at least 360°, and a pawl on the support biased for abutment with a shoulder on the driven member to limit each rotational advance of the latter to 360°, the driver having a pawl adapted to abut an opposing shoulder on the driven member during each forward stroke of the oscillation and to pass idly thereby during each return stroke, said driver being adapted to move the first-mentioned pawl to a position clear of the first-mentioned shoulder during each return stroke, and cooperating formations on the driver and first-mentioned pawl for holding the latter in said position during the initial part of each forward stroke of the driver.

6. A machine according to claim 5 in which there is a clamp for holding the work spindle against rotation in its support, and means for coordinating the operation of said clamp with that of said means for oscillating the driver, to cause release of the clamp for each forward stroke of oscillation of the driver and application of the clamp prior to each return stroke.

7. A machine according to claim 1 in which said index mechanism comprises a fluid-pressure actuated piston, a reversing valve for controlling the piston, and means, including a cam driven by said drive means, for reversing said valve.

References Cited by the Examiner

UNITED STATES PATENTS

| | | | |
|---|---|---|---|
| 2,096,134 | 10/37 | Raber et al. | 90—22 X |
| 2,390,596 | 12/45 | Larsen | 74—816 |
| 2,667,818 | 2/54 | Stewart et al. | 90—5 |
| 2,898,780 | 8/59 | Carlsen et al. | 74—816 |
| 2,947,223 | 8/60 | Carlsen et al. | 90—5 |

References Cited by the Applicant

UNITED STATES PATENTS

| | | |
|---|---|---|
| 1,830,971 | 11/31 | Taylor. |
| 1,982,050 | 11/34 | Gleason et al. |
| 2,444,551 | 7/48 | Bauer. |
| 2,857,819 | 10/58 | Wildhaber et al. |

WILLIAM W. DYER, JR., *Primary Examiner.*